(12) United States Patent
Garakani

(10) Patent No.: US 6,898,183 B1
(45) Date of Patent: May 24, 2005

(54) METHOD OF DETERMINING A DATA LINK PATH IN A MANAGED NETWORK

(75) Inventor: Mehryar Garakani, Los Angeles, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/524,725

(22) Filed: Mar. 14, 2000

(51) Int. Cl.[7] .................. H04L 12/28; H04L 12/00; H04J 3/14; G01R 31/00; G08C 25/00

(52) U.S. Cl. ................ 370/238; 370/230; 370/255; 370/244; 370/245; 370/395.53

(58) Field of Search .................. 370/230, 231, 370/235, 238, 241–245, 252, 254, 255, 395.53, 395.1

(56) References Cited

U.S. PATENT DOCUMENTS

| | | | | | |
|---|---|---|---|---|---|
| 5,805,593 | A | * | 9/1998 | Busche | 370/396 |
| 5,926,463 | A | * | 7/1999 | Ahearn et al. | 370/254 |
| 6,172,981 | B1 | * | 1/2001 | Cox et al. | 370/401 |
| 6,301,244 | B1 | * | 10/2001 | Huang et al. | 370/351 |
| 6,304,901 | B1 | * | 10/2001 | McCloghrie et al. | 709/221 |
| 6,304,912 | B1 | * | 10/2001 | Oguchi et al. | 709/238 |
| 6,363,319 | B1 | * | 3/2002 | Hsu | 701/202 |
| 6,396,488 | B1 | * | 5/2002 | Simmons et al. | 715/812 |
| 6,490,244 | B1 | * | 12/2002 | Pegrum et al. | 370/216 |
| 6,493,318 | B1 | * | 12/2002 | Bare | 370/238 |
| 6,522,627 | B1 | * | 2/2003 | Mauger | 370/230 |
| 6,538,997 | B1 | * | 3/2003 | Wang et al. | 370/241 |
| 6,560,654 | B1 | * | 5/2003 | Fedyk et al. | 709/239 |
| 6,578,086 | B1 | * | 6/2003 | Regan et al. | 709/242 |
| 6,614,765 | B1 | * | 9/2003 | Bruno et al. | 370/255 |
| 6,711,152 | B1 | * | 3/2004 | Kalmanek et al. | 370/351 |
| 6,711,171 | B1 | * | 3/2004 | Dobbins et al. | 370/400 |
| 2003/0123448 | A1 | * | 7/2003 | Chang | 370/395.1 |

* cited by examiner

*Primary Examiner*—Hassan Kizou
*Assistant Examiner*—Ahmed Elallam
(74) *Attorney, Agent, or Firm*—Hickman Palermo Truong & Becker LLP

(57) ABSTRACT

A mechanism for determining a data link path in a managed network between a source device and a destination device is disclosed. To determine the data link path, a mechanism determines the topology of the network. Information on the topology is needed in order to create a Connected Group space based on the topology. By creating a Connected Group space, the problem of determining a data link path is reduced to an optimization problem of finding the shortest path between the source device and destination device in the managed network. The shortest path is then transformed back into the topology space to reveal the data link path network between the source device and the destination device.

36 Claims, 7 Drawing Sheets

METHOD OF DETERMINING A DATA LINK PATH IN A MANAGED NETWORK

FIELD OF THE INVENTION

The present invention generally relates to the management of network systems, and more specifically to determining a method of determining a data link path in a managed network.

BACKGROUND OF THE INVENTION

A computer network generally includes a number of devices, including switches, routers and hubs, connected so as to allow communication among the devices. The devices within a network are often categorized into two classes: end stations such as workstations, desktop PCs, printers, servers, hosts, fax machines, and devices that primarily supply or consume information; and network devices such as gateways, switches and routers that primarily forward information between the other devices.

Network devices ordinarily operate on a continuous basis. Each device has one or more circuit boards, a microprocessor and a memory, and runs a control program. In general, networks often include several different types of data switching and routing devices. These network devices may have different physical characteristics. New devices, with characteristics that are presently unknown, are constantly being developed. In addition, the characteristics of many network devices may change over time. For example, characteristics of the network devices change when subsystems like boards, network interface modules, and other parts are added or removed from a device.

Many networks are managed, supervised and maintained by a network administrator or network manager. To properly maintain a network, the network administrator needs to have up-to-date information available about the devices in the network and how the devices are interconnected. The Open Systems Interconnection ("OSI") network reference model is useful in classifying network management information. Layer 2 and Layer 3 refer to the data link layer and the network layer respectively in the OSI model. Layer 2 connectivity information may be used by the network administrator to understand the physical topology of the network. The topology is a mapping that indicates the type of devices that are currently included in the network and how the interfaces of these devices are physically linked.

An effective network management system would show both the logical connections of network devices, and the physical connection information. Not only would the network management system be capable of logically identifying to which network a particular device is linked, based on Layer 3 information, but also indicate how individual devices are physically linked together, based on Layer 2 information. Thus, an administrator could determine the actual interface links or physical connectivity of each of the devices. This information may be critical in determining how the network can be expanded or upgraded, or in troubleshooting.

Certain proprietary discovery protocols have been developed to help identify how the interfaces of each device is physically linked within a network, based on Layer 2 information. For example, the Cisco Discovery Protocol ("CDP"), which is used in products that are commercially available from Cisco Systems, Inc., San Jose, Calif., is a low-level communication protocol that can help identify how devices are linked in a network. When a device supporting CDP sends a message to another device, the message includes a packet that contains its IP address and an interface descriptor. The interface descriptor represents the logical name of the port from which the message was sent. The information is recorded at the receiving device and may be used to determine how two devices are physically connected.

However, knowledge of the physical topology of the network may not be sufficient for diagnosing an error in the network. One technique of gathering information on errors and configuration in a network that uses Internet Protocol ("IP") is path tracing for an IP packet. It is desirable for IP path tracing to be performed both at Layer 3 and Layer 2. Tools such as the UNIX-based traceroute computer program and the Windows-based tracert computer program are used to perform IP path tracing at Layer 3. However, techniques for direct IP path tracing at Layer 2 that are suitable for a wide range of technologies including Ethernet, Local Area Network Emulation, Token Ring, and EtherChannel are not available. A Layer 2 IP path is hereafter referred to as a "data link path". A data link path is important for network monitoring and diagnostics because the information obtained from IP path tracing performed at Layer 3 may be insufficient. For example, IP path tracing at Layer 3 identifies a path from router to router and does not identify the actual network devices such as LANs switches and bridges that an IP packet may traverse to get from a source device to a destination device.

Based on the foregoing, there is a clear need for a mechanism that can identify the data link path from a source device to a destination device on the network.

There is a specific need for a way to carry out IP Path tracing at Layer 2.

SUMMARY OF THE INVENTION

The foregoing needs, and other needs and objects that will become apparent from the following description, are achieved in the present invention, which comprises, in one aspect, a method for determining a logical path in a managed network between a source device and a destination device at a data link layer, comprising the computer-implemented steps of creating and storing a Connected Group Space representation of network devices based on a topology space representation of the network devices; identifying an optimized path in the Connected Group Space representation; transforming the optimized path into the topology space representation; and creating and storing the optimized path that was transformed into the topology space representation as the data link layer path.

One feature involves a managed IP network. Another feature involves identifying a set of Connected Group nodes associated with the Connected Group Space representation; identifying Connected Group links that connect the Connected Group nodes; and creating and storing information that represents the Connected Group links.

A related feature involves identifying a subnet associated with the source device and the destination device; determining a set of network links that link one or more network devices in the managed network; and determining an assignment of ports of network devices.

Another feature involves identifying all Virtual Local Area Networks (VLANs) associated with a subnet associated with the source device and the destination device; and identifying all Emulated Local Area Networks (ELANs) associated with the subnet.

According to another feature, creating and storing a Connected Group Space representation further comprises the steps of: creating one Connected Group node for any pairs of interfaces across a point-to-point link in the topology space representation; creating one Connected Group node for any interfaces of the managed network that are directly connected by virtue of being on a same physical medium; creating one Connected Group node for LAN Emulation interfaces on a same Emulated Local Area Network (ELAN); creating one Connected Group node for each internal interface of any network device when the network device has an internal interface; creating one Connected Group node for the source device; creating one Connected Group node for the destination device; and creating one Connected Group node for each user interface on any network device when the network device has a user interface.

Another feature involves the step of determining Connected Group links between Connected Group nodes in a subnet associated with the source device and the destination device.

A related feature is the step of creating one Connected Group link for each pair of interfaces within each network device, wherein each interface is associated with the subnet of the source device and the destination device and is in a forwarding state.

Yet another feature involves the step of checking a spanning tree status for each interface within each network device to determine whether the interface is in the forwarding state.

Still another feature wherein the step of identifying an optimized path in the Connected Group Space representation relates to the step of finding a shortest path between a Connected Group source node and a Connected Group destination node.

Another feature involves the step of using a Dijkstra algorithm to find the shortest path between the Connected Group source node and the Connected Group destination node.

According to another feature, wherein the step of transforming the optimized path into the topology space representation further comprises the steps of: identifying an ordered set of Connected Group nodes associated with the optimized path; and identifying an ordered set of Connected Group links associated with the ordered set of Connected Group nodes.

A related feature involves: identifying a pair of interfaces associated with each Connected Group link in the ordered set of Connected Group nodes associated with the optimized path; and generating an ordered set of topology space links from the pairs of interfaces associated with Connected Group links.

The invention also encompasses a computer-readable medium, a computer data signal embodied in a carrier wave, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining a data link path in a managed network between a source device and a destination device are disclosed.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Overview

Figure 1:
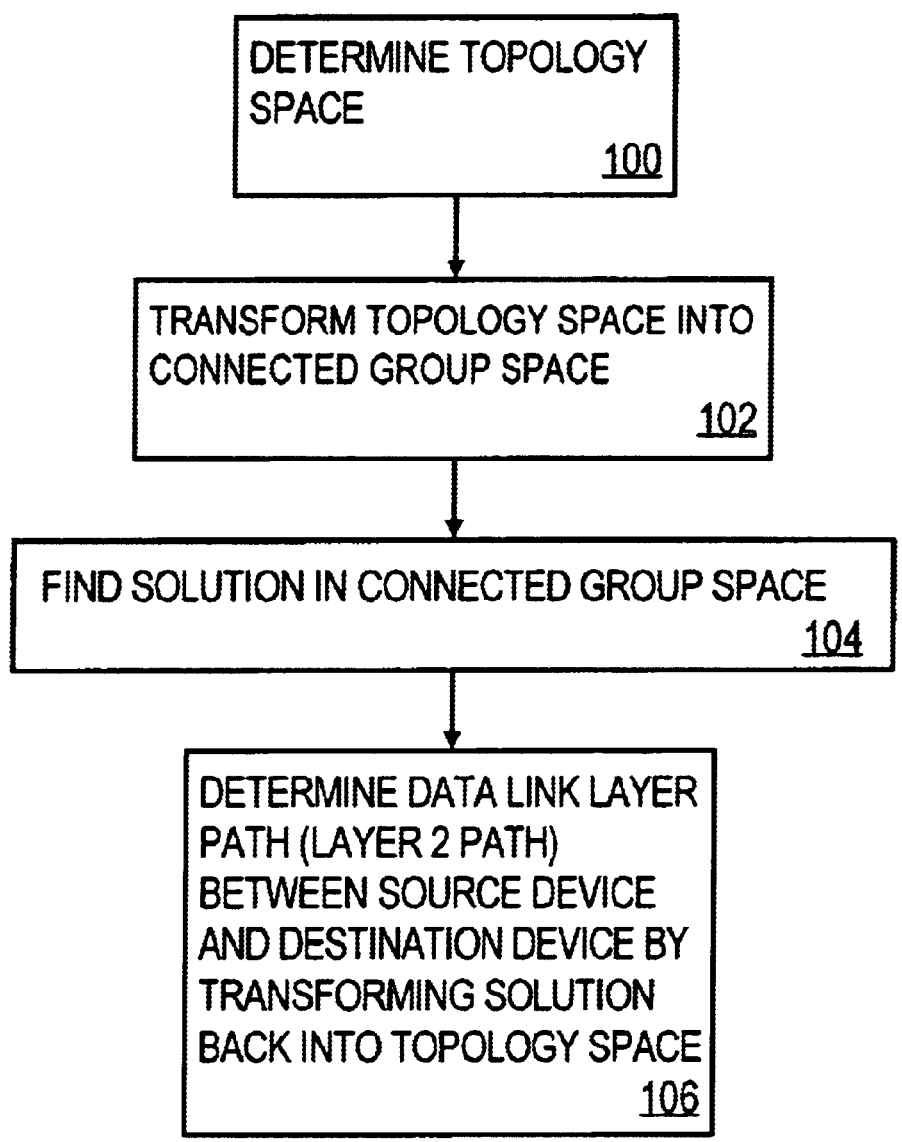
FIG. 1 is a flow diagram that illustrates determining the data link path of a data packet between a source device and a destination device in the network.

A mechanism is provided for determining the data link path of a data packet between a source device and a destination device in the network. In one embodiment as shown in FIG. 1, the mechanism determines a topology space of a managed network in block 100. The topology space is information that indicates the type of devices that are currently included in the network and how the interfaces of these devices are physically linked. Of particular interest are the routers and bridging devices such as LAN switches.

In block 102, the mechanism transforms the topology space into a Connected Group space ("CG space"). The transformation into CG space converts the problem of determining a Layer 2 path between a particular source and destination device into an optimization problem. Thus, at block 104, the mechanism finds a solution to the problem of determining a Layer 2 path between a particular source and destination device in CG space by determining the optimal path in the CG space between the source device and the destination device.

At block 106, the mechanism determines a data link path (Layer 2 path) between the source device and the destination device by transforming the solution that was determined in the CG space back into the topology space. As a result, a Layer 2 path between devices is determined.

Details of transformations from the topology space to the CG space are further explained below.

Connected Group Space

The Connected Group space ("CG Space") comprises Connected Group nodes and Connected Group links that join the Connected Group nodes.

1. Determining Connected Group Nodes

It is assumed that a network management system or equivalent mechanism has previously performed network device discovery by using an appropriate means such as Cisco Discovery Protocol ("CDP"). With CDP, a network management system is able to identify the devices in the network and how these devices are linked in a network.

Figure 2:
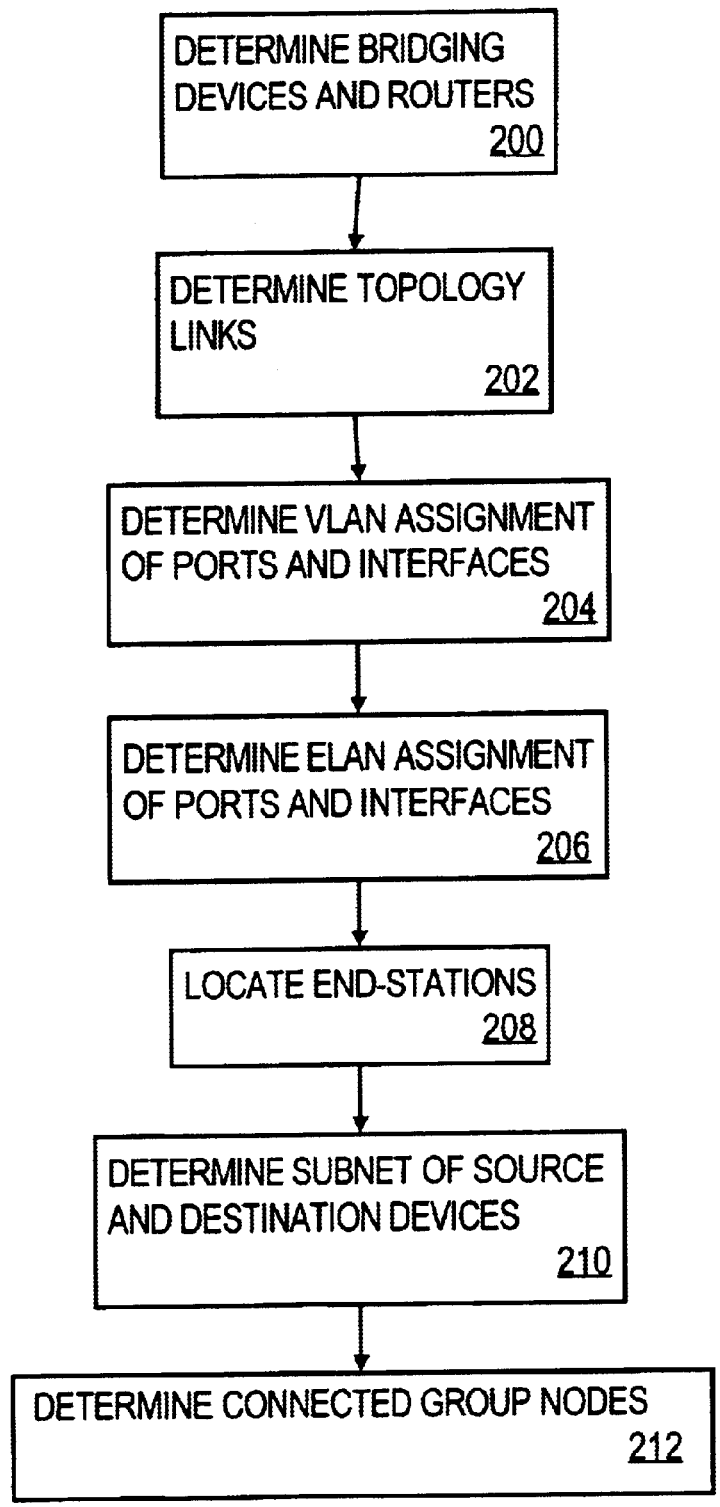
FIG. 2 is a flow diagram that illustrates determining Connected Group ("CG") nodes.

In one embodiment, a method or mechanism determines the CG nodes by first gathering information on the topology space. Thus, at block 200 in FIG. 2, the mechanism determines all bridging devices and routers in the managed network, as well as the links that join these devices and routers to one another. Information defining the devices and links is created and stored. At block 202, the mechanism determines the topology links, which are links that physically connect the routers and bridging devices to one another through their interfaces and ports. Information representing the links is created and stored.

In addition, the mechanism obtains information on the ports and interfaces of the bridging devices and routers. At block 204, the mechanism determines to which Virtual Local Area Network ("VLAN") the ports and interfaces of the devices that were determined at block 200 have been assigned. Similarly, at block 206, the mechanism determines to which Emulated Local Area Network ("ELAN") the ports and interfaces of the devices that were determined at block 200 have been assigned. In one embodiment, the information on VLAN and ELAN assignment of ports and interfaces can be obtained from various Management Information Bases ("MIBs"), which are databases of network information that are maintained in the network devices and accessible by a network management protocol, such as Simple Network Management Protocol ("SNMP").

To complete the topology, any end-stations, such as workstations or personal computers, are discovered. Thus, at block 208, the mechanism determines the location of any and all end-stations in the managed network. In one embodiment, the mechanism discovers end-stations in the managed network by matching entries in the Address Resolution Protocol tables ("ARP tables") of the routers with entries in the Bridge tables of LAN switches.

Because the data link path that a packet would traverse is constrained by VLAN and ELAN relationships, at block 210 the mechanism determines the subnet of the source and destination devices. The subnet of the source and destination devices identifies the relevant VLANs and ELANs in the managed network that are associated with the subnet. The VLANs and ELANs that are not associated with the subnet are excluded from consideration when determining the data link path between the source and destination devices. The determination of the subnet of the source and the destination device may be performed using known layer 3 tracing techniques.

At block 212, the mechanism determines the CG nodes in the subnet of the source and destination device. The mechanism creates a CG node (a) for each pair of ports in the subnet that are across a point-to-point link, (b) for each set of ports that are directly connected because they reside on a shared physical medium, (c) for each set of LANE interfaces on each ELAN in the subnet, (d) for any internal ports on bridging devices on the subnet, and (e) for any user ports on bridge devices. Further, a CG node is also created for the source device and one is created for the destination device.

Figure 3:
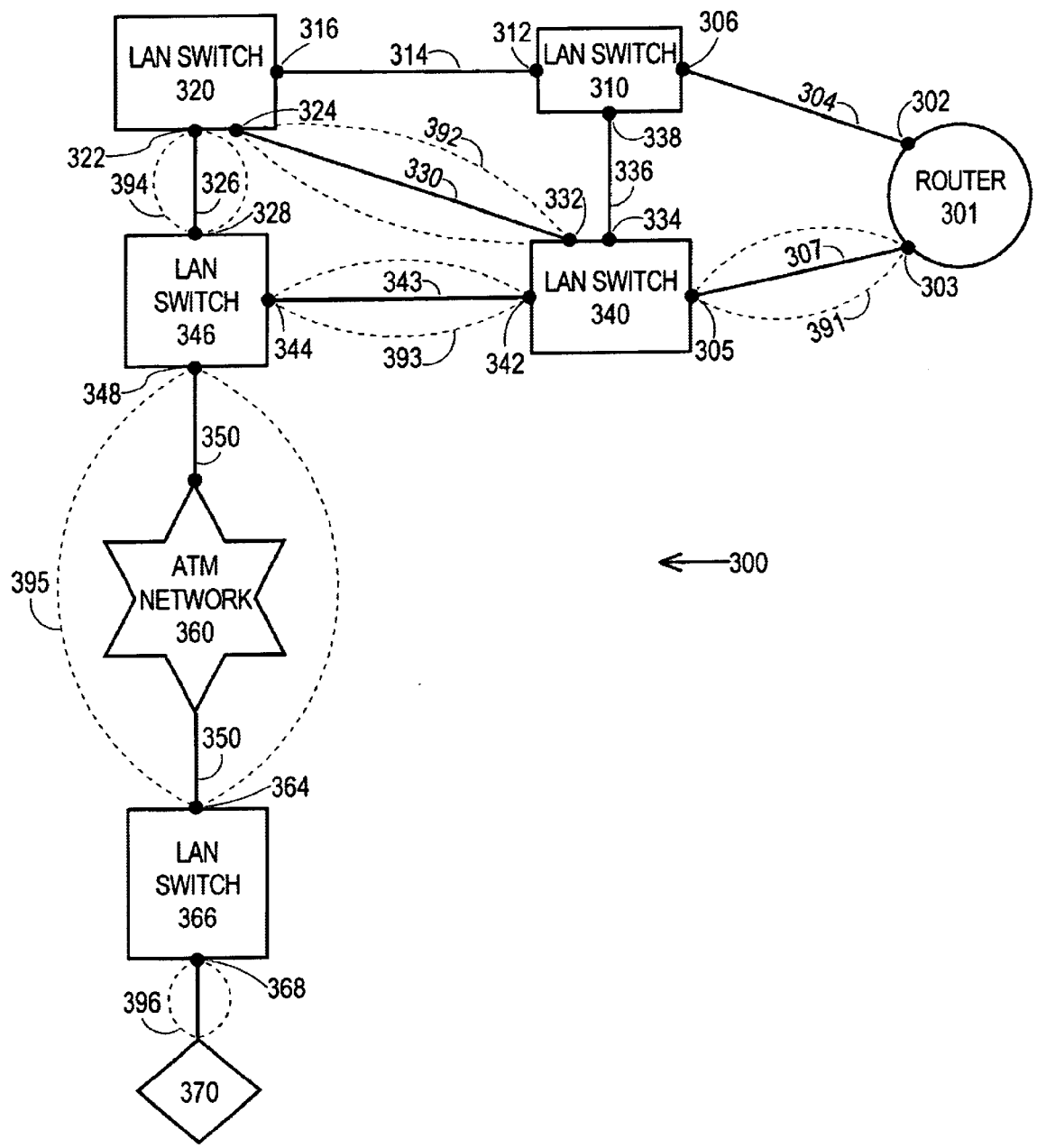
FIG. 3 is a block diagram that illustrates the topology of a managed network.

As an example, FIG. 3 illustrates the topology of a managed network 300. The topology consists of a source device, router 301. In addition, managed network 300 has LAN switches 310, 320, 346, 340, and 366. In particular, the LAN switches 346 and 366 are connected across an ATM network 360.

Router 301 has interfaces 302, 303. LAN switch 310 has ports 306, 312, 338. LAN switch 320 has ports 316, 322, 324. LAN switch 346 has ports 328, 344, 348. LAN switch 340 has ports 305, 334, 332, 342. LAN switch 366 has ports 364, 368.

Interface 303, and ports 305, 332, 342, 324, 322, 328, 344, and 368 are assigned to VLAN1. Interface 302, and ports 334, 306, 338, 312, and 316 are assigned to VLAN2. Ports 348 and 364 are assigned to ELAN1.

Topology link 307 connects interface 303 of router 301 to port 305 of LAN switch 340. Topology link 304 connects interface 302 of router 301 to port 306 of LAN switch 310. Topology link 336 connects port 334 of LAN switch 340 to port 338 of LAN switch 310. Topology link 330 connects port 332 of LAN switch 340 to port 324 of LAN switch 320. Topology link 314 connects port 312 of LAN switch 310 to port 316 of LAN switch 320. Topology link 343 connects port 342 of LAN switch 340 to port 344 of LAN switch 346. Topology link 326 connects port 328 of LAN switch 346 to port 322 of LAN switch 320. Finally, topology link 350 connects port 348 of LAN switch 346 to port 364 of LAN switch 366.

Managed Network 300 has one end-station 370, which is also the destination device in the example of FIG. 3. End-station 370 resides behind port 368 on switch 366.

The relevant subnet is the subnet of the source and destination device. Assume that the source and destination devices are on subnet "s". Further, assume that the relevant VLANs and ELANs on subnet "s" are VLAN1 and ELAN1. As shown in FIG. 3, VLAN1 and ELAN1 are bound by LAN switches 346 and 366.

Based on the above information and the above criteria for creating CG nodes, one of the CG nodes is CG node 391 comprising interface 303 and port 305. CG node 391 is the source CG node in this example. Similarly, CG node 396 comprising port 368 that is connected to end station 370 is the destination CG node. The other CG nodes in subnet "s", which is the subnet of the source and destination device, are CG node 392 comprising port 332 connected to port 324, CG node 393 comprising port 342 connected to port 344, CG node 394 comprising 322 connected to port 328, and CG node 395 comprising port 348 connected to port 364.

2. Determining Connected Group Links

A Connected Group link is a link between two Connected Group nodes. In one embodiment, a Connected Group link corresponds to a bridging link that joins two ports. The mechanism is able to determine the CG links between the relevant CG nodes in the subnet of the source and destination devices ("relevant subnet") by determining the "forwarding" state of each port in the relevant subnet that is participating in the Spanning Tree Protocol ("STP"). If a bridging device has "n" ports that are associated with the relevant subnet, then the bridging device contributes m(m−1)*0.5 CG links to the CG space.

Figure 4:
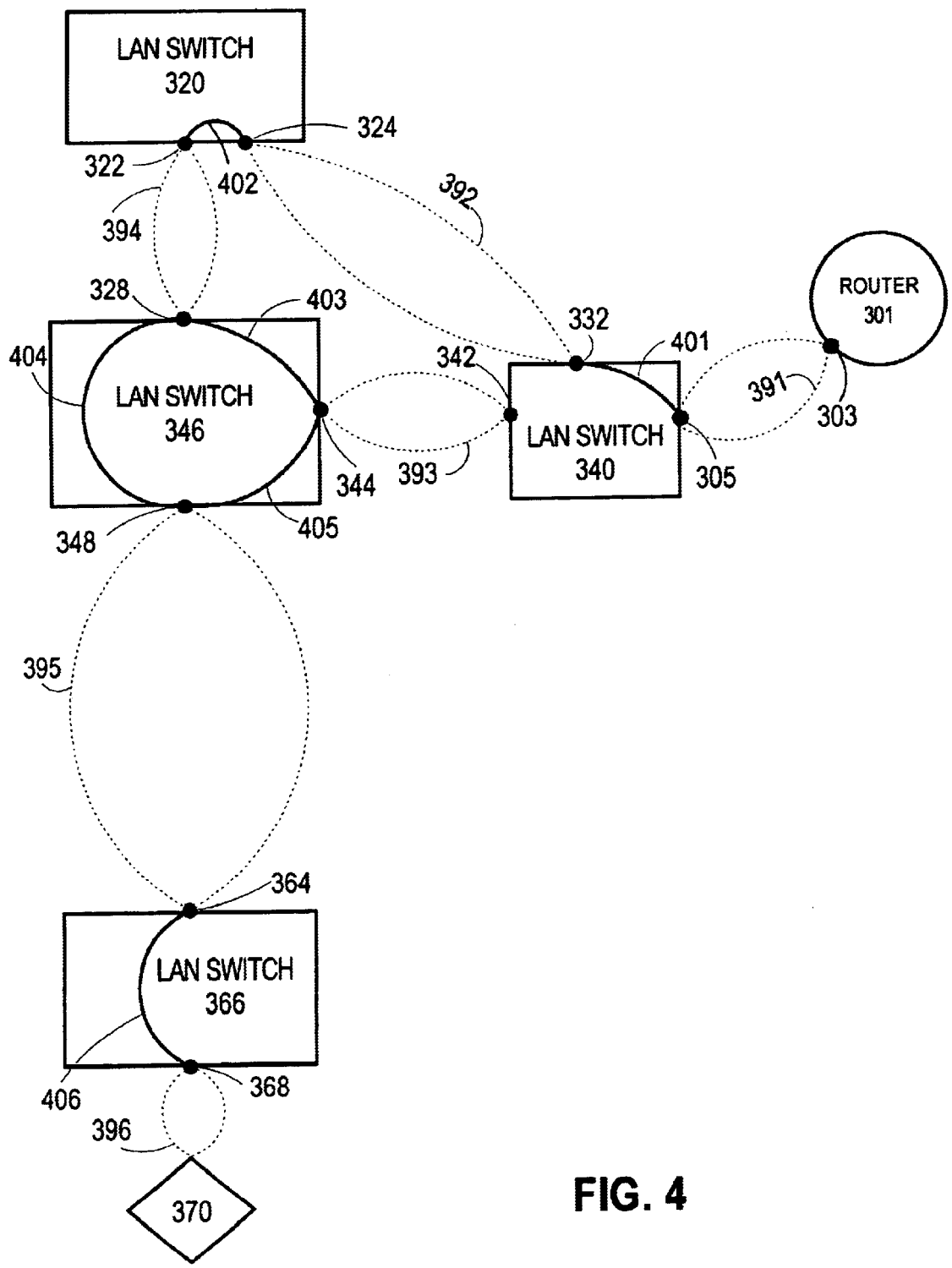
FIG. 4 is a block diagram that illustrates the CG links that connect the CG nodes.

FIG. 4 illustrates the CG links connecting the CG nodes in the relevant subnet for the example of FIG. 3. Referring to the above example, assume that a bridging device, LAN switch 340, is participating in the STP. Also assume that ports 305 and 332 are in the "forwarding state." Further assume that port 342 of LAN switch 340 is blocked by the Spanning Tree. CG link 401 corresponds to the bridging link that joins ports 305 and 332 of LAN switch 340. Thus, CG link 401 connects CG nodes 391 and 392.

Similarly, another bridging device, LAN switch 320, has two ports that are participating in the STP, namely, ports 322 and 324. Assume that both ports are in the forwarding state. CG link 402 joins ports 322 and 324 of LAN switch 320. Link 402 connects CG nodes 392 and 394. Bridging device LAN switch 346 has three ports 328, 348, and 344, all of which are in the forwarding state. CG link 404 joins ports 328 to port 348. CG link 403 joins port 328 to port 344 and CG link 405 joins port 344 to port 348. Thus, CG nodes 394 and 395 may be connected by CG link 404 or by the combination of CG links 403 and 405.

Finally, bridging device, LAN switch 366, has two ports that are participating in the STP, namely, ports 364 and 368, and which are in the forwarding state. CG link 406 joins ports 364 and 368. Thus, CG nodes 395 and 396 are connected by CG link 406.

Solution in Connected Group Space

Once the mechanism has transformed the topology space into a Connected Group space ("CG space"), the problem of determining the data link path has been converted into an optimization problem. Thus, the mechanism finds a solution path in CG space by determining the optimal path in the CG space between the source device and the destination device. In one embodiment, the optimal path is the shortest path through CG links that joins the source CG node to the destination CG node.

In one embodiment, Dijkstra's algorithm is used to find the shortest path that joins the source CG node to the destination CG node. Dijktsra's algorithm is described in Douglas E. Corner, "Computer Networks and Internets", (Prentice-Hall, 1997), at 129.

Figure 5:
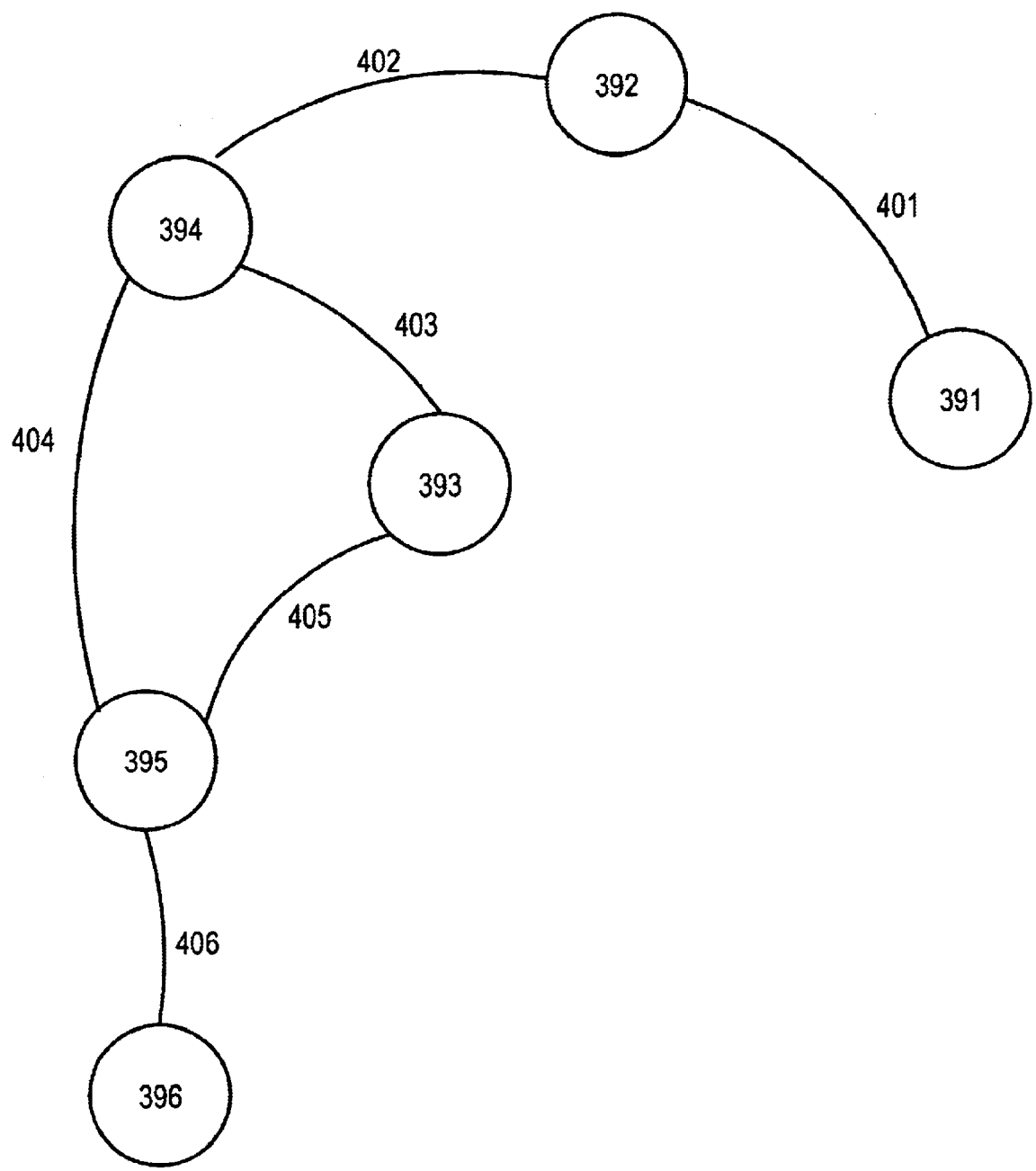
FIG. 5 is a block diagram that illustrates the shortest path joining the source CG node to the destination CG node.

Assume that the mechanism determines that the shortest path joining the source CG node to the destination CG node ("Dijkstra path") to be the ordered set of CG nodes 391, 392, 394, 395 and 396 as shown in FIG. 5. From FIG. 5, it can be seen that the Dijkstra path yields the following ordered set of CG links from the source CG node to the destination CG node: 401, 402, 404 and 406.

Transformation of Solution into Topology Space

The mechanism determines the data link path between the source device and the destination device by transforming the solution that was determined in the CG space back into the topology space.

The transformation involves converting an ordered set of CG links into an ordered set of the ports that are associates with the CG links, and into an ordered set of topology links. As shown in FIG. 4, the CG links in the Dijkstra path as determined above indicate that the data link path between source device, router 301, and destination device, end-station 370, include the following ordered set of ports: 305 to 332 to 324 to 322 to 328 to 348 to 364 to 368.

The above ordered set of ports corresponds to the following ordered set of links in topology space: 307 to 330 to 326 to 350. Thus, the complete data link path from source device, router 301, to destination device, end-station 370, as shown in topology space in FIG. 3 is source device, router 301, to topology link 307 to topology link 330 to topology link 326 to topology link 350 to port 368 to destination device, end-station 370.

Verification of Solution

The data link path as determined above may be verified using the information from Bridge Forwarding Tables maintained by bridging devices such as LAN switches. In a managed network, the source and destination devices each are assigned a unique numeric value called a media access address ("MAC address"). A frame that is sent across a managed network contains the MAC address of the source device and that of the intended recipient, the destination device.

Figure 6:
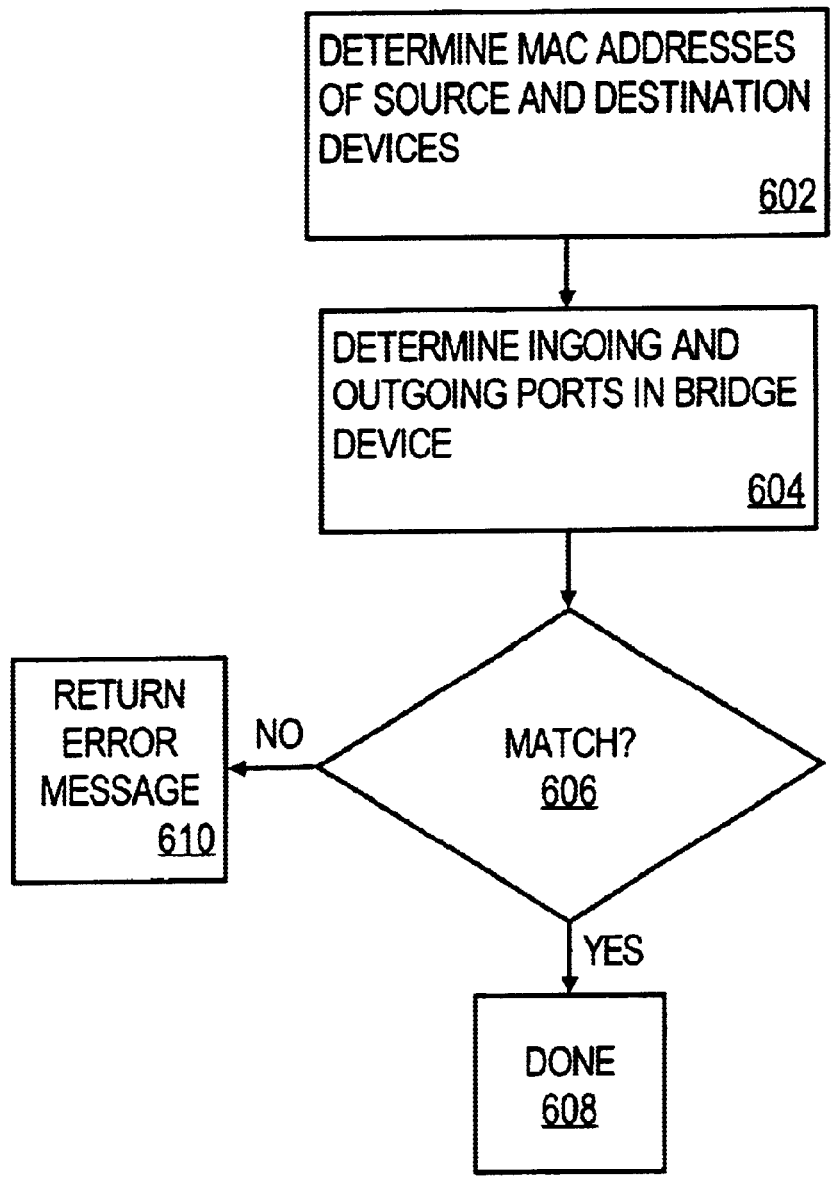
FIG. 6 is a flow diagram that illustrates determining the process of verification of the Dijkstra path.

FIG. 6 illustrates a process of verification of the Dijkstra path. At block 602, the mechanism determines the MAC addresses of the source and destination devices. The MAC addresses of the source and destination devices can be obtained by querying the ARP tables of the routers in the managed network. At block 604, the mechanism determines the ingoing and outgoing ports in each bridge device based on the MAC address information obtained in block 602. The mechanism uses the MAC addresses to find the corresponding ingoing and outgoing ports at a particular device by doing a table look-up in the Bridge Forward Table maintained by the particular bridge device.

At block 606, the mechanism determines if there is match between the set of ingoing and outgoing ports as determined by the process described in block 604 to the set of ingoing and outgoing ports that make up the Dijkstra path. If the two sets of ports match, then the verification process is complete at block 608. Otherwise, at block 610, an error message is returned or other action is taken, because the path is not verified.

Hardware Overview

Figure 7:
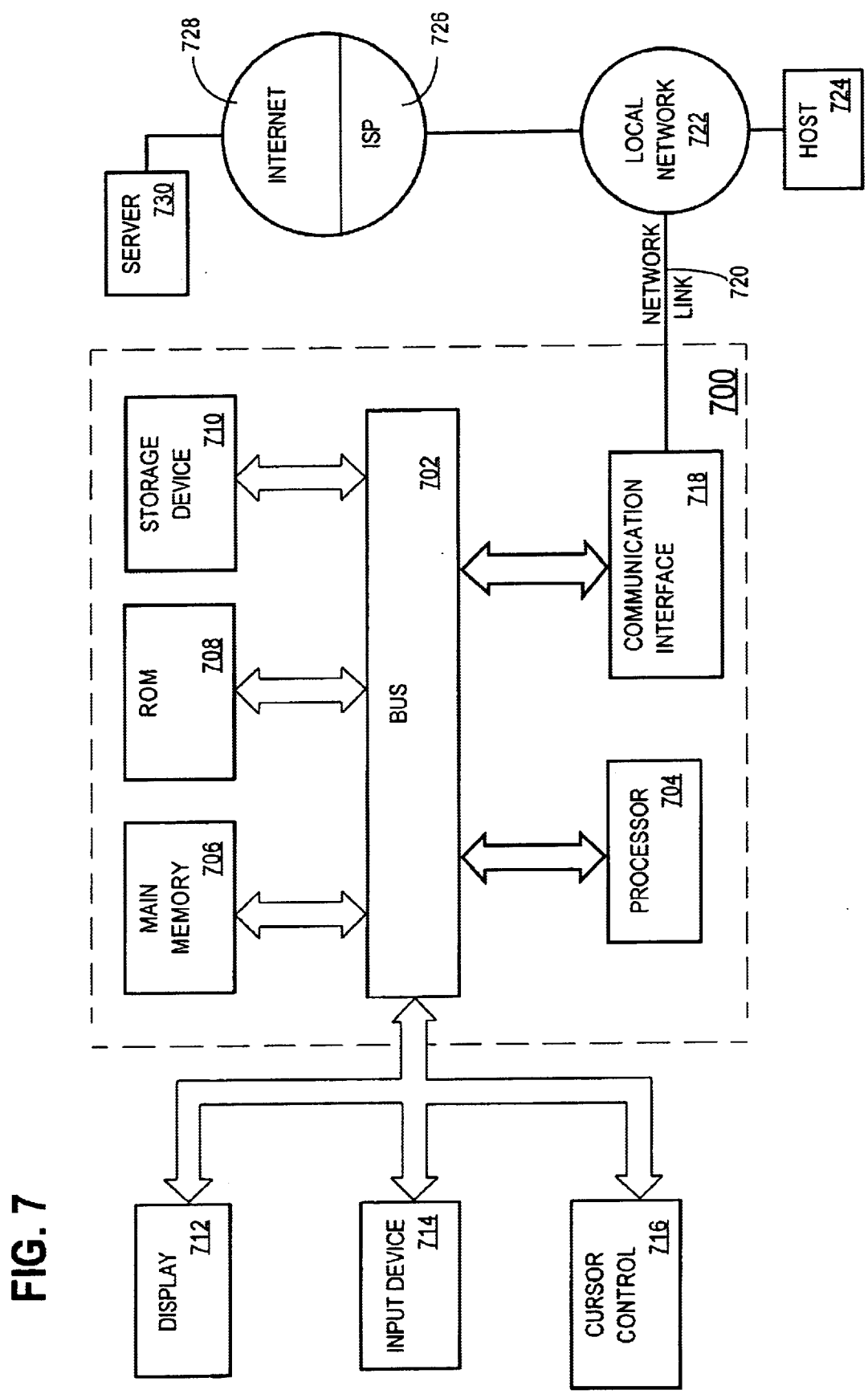
FIG. 7 is a block diagram of a computer system hardware arrangement that can be used to implement aspects of the invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for determining a data link path in a managed network between a source device and a destination device. According to one embodiment of the invention, determining a data link path in a managed network between a source device and a destination device is carried out by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for determining a data link path in a managed network between a source device and a destination device as described herein.

The received code may be executed by processor 704 as it is received, and/or stored in storage device 710, or other non-volatile storage for later execution. In this manner, computer system 700 may obtain application code in the form of a carrier wave.

In describing certain embodiments of the invention, several drawing figures have been used for explanation purposes. However, the invention is not limited to any particular context as shown in drawing figures, and the spirit and scope of the invention include other contexts and applications in which the mechanisms and processes described herein is available to other mechanisms, methods, programs, and processes. Thus, the specification and drawings are, accordingly, to be regarded in an illustrative rather than a restrictive sense.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for determining a logical path in a managed network between a source device and a destination device at a data link layer, the method comprising the computer-implemented steps of:

creating and storing a Connected Group Space representation of network devices based on a topology space representation of the network devices;

identifying an optimized path in the Connected Group Space representation;

transforming the optimized path into the topology space representation; and creating and storing the optimized path that was transformed into the topology space representation as the data link layer path.

2. The method as recited in claim 1, wherein the managed network is a managed IP network.

3. The method as recited in claim 1, wherein the step of creating and storing a Connected Group Space representation further comprises the steps of:

identifying a set of Connected Group nodes associated with the Connected Group Space representation;

identifying Connected Group links that connect the Connected Group nodes; and creating and storing information that represents the Connected Group links.

4. The method as recited in claim 1, wherein the step of creating and storing a Connected Group Space representation further comprises the steps of:

identifying a subnet associated with the source device and the destination device;

determining a set of network links that link one or more network devices in the managed network; and determining an assignment of ports of network devices.

5. The method as recited in claim 1, wherein the step of creating and storing a Connected Group Space representation further comprises the steps of:

identifying all Virtual Local Area Networks (VLANs) associated with a subnet associated with the source device and the destination device; and identifying all Emulated Local Area Networks (ELANs) associated with the subnet.

6. The method as recited in claim 1, wherein the step of creating and storing a Connected Group Space representation further comprises the steps of:

creating one Connected Group node for any pairs of interfaces across a point-to-point link in the topology space representation;

creating one Connected Group node for any interfaces of the managed network that are directly connected by virtue of being on a same physical medium;

creating one Connected Group node for LAN Emulation interfaces on a same Emulated Local Area Network (ELAN);

creating one Connected Group node for each internal interface of any network device when the network device has an internal interface;

creating one Connected Group node for the source device;

creating one Connected Group node for the destination device; and creating one Connected Group node for each user interface on any network device when the network device has a user interface.

7. The method as recited in claim 6, further comprising the step of determining Connected Group links between Connected Group nodes in a subnet associated with the source device and the destination device.

8. The method as recited in claim 7, further comprising the step of creating one Connected Group link for each pair of interfaces within each network device, wherein each interface is associated with the subnet of the source device and the destination device and is in a forwarding state.

9. The method as recited in claim 8, further comprising the step of checking a spanning tree status for each interface within each network device to determine whether the interface is in the forwarding state.

10. The method as recited in claim 1, wherein the step of identifying an optimized path in the Connected Group Space representation further comprises the step of finding a shortest path between a Connected Group source node and a Connected Group destination node.

11. The method as recited in claim 10, further comprising the step of using a Dijkstra algorithm to find the shortest path between the Connected Group source node and the Connected Group destination node.

12. The method as recited in claim 1, wherein the step of transforming the optimized path into the topology space representation further comprises the steps of:

identifying an ordered set of Connected Group nodes associated with the optimized path; and identifying an ordered set of Connected Group links associated with the ordered set of Connected Group nodes.

13. The method as recited in claim 12, further comprising the steps of:

identifying a pair of interfaces associated with each Connected Group link in the ordered set of Connected Group nodes associated with the optimized path; and generating an ordered set of topology space links from the pairs of interfaces associated with Connected Group links.

14. The method of claim 1, further comprising the step of monitoring network devices by obtaining information about the network devices from information associated with the data linked path.

15. The method of claim 1, further comprising the step of obtaining diagnostic information by obtaining information about the network devices from information associated with the data linked path.

16. The method of claim 1, wherein the data link path is a trace of a path determinable from a bridge forwarding table.

17. The method of claim 1, wherein the data link path is verifiable by comparing information related to the data link path to information from a bridge forwarding table.

18. A computer-readable medium carrying one or more sequences of instructions for determining a logical path in a managed network between a source device and a destination device at a data link layer, wherein execution of the one or more sequences of instructions by one or more processors causes the one or more processors to perform the steps of:

creating and storing a Connected Group Space representation of network devices based on a topology space representation of the network devices;

identifying an optimized path in the Connected Group Space representation;

transforming the optimized path into the topology space representation; and creating and storing the optimized path that was transformed into the topology space representation as the data link layer path.

19. The computer-readable medium as recited in claim 18, wherein the managed network is a managed IP network.

20. The computer-readable medium as recited in claim 18, wherein the step of creating and storing a Connected Group Space representation further comprises the steps of:

identifying a set of Connected Group nodes associated with the Connected Group Space representation;

identifying Connected Group links that connect the Connected Group nodes; and creating and storing information that represents the Connected Group links.

21. The computer-readable medium as recited in claim 18, wherein the step of creating and storing a Connected Group Space representation further comprises the steps of:

identifying a subnet associated with the source device and the destination device;

determining a set of network links that link one or more network devices in the managed network; and determining an assignment of ports of network devices.

22. The computer-readable medium as recited in claim 18, wherein the step of creating and storing a Connected Group Space representation further comprises the steps of:

identifying all Virtual Local Area Networks (VLANs) associated with a subnet associated with the source device and the destination device; and identifying all Emulated Local Area Networks (ELANs) associated with the subnet associated with the source device and the destination device.

23. The computer-readable medium as recited in claim 18, wherein the step of creating and storing a Connected Group Space representation further comprises the steps of:

creating one Connected Group node for any pairs of interfaces across a point-to-point link in the topology space representation;

creating one Connected Group node for any interfaces of the managed network that are directly connected by virtue of being on a same physical medium;

creating one Connected Group node for LAN Emulation interfaces on a same Emulated Local Area Network (ELAN);

creating one Connected Group node for each internal interface of any network device when the network device has an internal interface;

creating one Connected Group node for the source device;

creating one Connected Group node for the destination device; and creating one Connected Group node for each user interface on any network device when the network device has a user interface.

24. The computer-readable medium as recited in claim 23, further comprising the step of determining Connected Group links between Connected Group nodes in a subnet associated with the source device and the destination device.

25. The computer-readable medium as recited in claim 24, further comprising the step of creating one Connected Group link for each pair of interfaces within each network device, wherein each interface is associated with the subnet of the source device and the destination device, and is in a forwarding state.

26. The computer-readable medium as recited in claim 25, further comprising the step of checking a spanning tree status for each interface within each network device to determine whether the interface is in the forwarding state.

27. The computer-readable medium as recited in claim 18, wherein the step of identifying an optimized path in the Connected Group Space representation further comprises the step of finding a shortest path between a Connected Group source node and a Connected Group destination node.

28. The computer-readable medium as recited in claim 27, further comprising the step of using a Dijkstra algorithm to find the shortest path between the Connected Group source node and the Connected Group destination node.

29. The computer-readable medium as recited in claim 18, wherein the step of transforming the optimized path into the topology space representation further comprises the steps of:

identifying an ordered set of Connected Group nodes associated with the optimized path; and identifying an ordered set of Connected Group links associated with the ordered set of Connected Group nodes.

30. The computer-readable medium as recited in claim 29, further comprising the steps of:

identifying a pair of interfaces associated with each Connected Group link in the ordered set of Connected Group nodes associated with the optimized path; and generating an ordered set of topology space links from the pairs of interfaces associated with Connected Group links.

31. The computer readable medium of claim 18, wherein the instructions further comprise the step of monitoring network devices by obtaining information about the network devices from information associated with the data linked path.

32. The computer readable medium of claim 18, wherein the instructions further comprise the step of obtaining diagnostic information by obtaining information about the network devices from information associated with the data linked path.

33. The computer readable medium of claim 18, wherein the data link path is a trace of a path determinable from a bridge forwarding table.

34. The computer readable medium of claim 18, wherein the data link path is verifiable by comparing information related to the data link path to information from a bridge forwarding table.

35. A computer data signal embodied in a carrier wave, the computer data signal carrying one or more sequences of instructions for determining a logical path in a managed network between a source device and a destination device at a data link layer, wherein execution of the one or more sequences of instructions by one or more processors causes the one or more processors to perform the steps of:

creating and storing a Connected Group Space representation of network devices based on a topology space representation of the network devices;

identifying an optimized path in the Connected Group Space representation;

transforming the optimized path into the topology space representation; and creating and storing the optimized path that was transformed into the topology space representation as the data link layer path.

36. A computer apparatus comprising:

a processor; and a memory coupled to the processor, the memory containing one or more sequences of instructions for determining a logical path in a managed network between a source device and a destination device at a data link layer, wherein execution of the one or more sequences of instructions by the processor causes the processor to perform the steps of:

creating and storing a Connected Group Space representation of network devices based on a topology space representation of the network devices;

identifying an optimized path in the Connected Group Space representation;

transforming the optimized path into the topology space representation; and creating and storing the optimized path that was transformed into the topology space representation as the data link layer path.

* * * * *